United States Patent [19]

Leffingwell et al.

[11] 4,247,603
[45] Jan. 27, 1981

[54] PLUG-IN RECHARGEABLE BATTERY AND SOCKET THEREFOR

[75] Inventors: Edward A. Leffingwell, Gainesville, Fla.; Billy E. Stillwell, Portsmouth, Va.

[73] Assignee: General Electric Company, Gainesville, Fla.

[21] Appl. No.: 4,202

[22] Filed: Jan. 17, 1979

[51] Int. Cl.³ .................... H01M 2/02; H01M 2/10
[52] U.S. Cl. ........................ 429/1; 429/49; 429/157; 429/158; 429/159
[58] Field of Search ............. 429/1, 156, 157, 158, 429/159, 97, 98, 99, 100, 178

[56] References Cited

U.S. PATENT DOCUMENTS

| 777,457 | 4/1904 | Wappler et al. | 429/159 |
|---|---|---|---|
| 1,215,004 | 2/1917 | Decker | 429/158 |
| 3,506,902 | 4/1970 | Sullivan | 429/156 |
| 3,655,452 | 4/1972 | Cich | 429/159 |
| 3,957,540 | 5/1976 | Mabuchi et al. | 429/99 |

FOREIGN PATENT DOCUMENTS

| 990344 | 6/1976 | Canada | 429/159 |
|---|---|---|---|
| 2422782 | 11/1975 | Fed. Rep. of Germany | 429/159 |
| 597409 | 11/1925 | France | 429/159 |
| 761629 | 11/1956 | United Kingdom | 429/159 |

OTHER PUBLICATIONS

Riedlinger III, P. C. Board Mounted Battery Holder, Technical Digest No. 45, Jan. 1977, p. 35, Western Electric.

*Primary Examiner*—Donald L. Walton
*Attorney, Agent, or Firm*—Morgan, Finnegan, Pine, Foley & Lee

[57] ABSTRACT

A rechargeable plug-in battery compatible with printed circuits and the like. At least one rechargeable storage cell is mounted inside a battery case having at least two terminal pins which extend through the battery case for insertion to a mating socket. Inside the casing, the pins are welded directly to the battery terminals, and recesses formed in the base and cover portions of the battery case at the interior receive the storage cell, or cells, so as to restrain them against movement.

12 Claims, 5 Drawing Figures

PLUG-IN RECHARGEABLE BATTERY AND SOCKET THEREFOR

BACKGROUND OF THE INVENTION

The mounting of non-standard electrical components to circuit boards has long been a problem. It is, moreover, a problem which has become increasingly perplexing as circuit miniaturization and standardization of printed circuit board terminal connections have made circuit board assembly less adaptable to hybrid connection techniques.

When printed circuit boards were first introduced, it was not uncommon for electronic components to be mounted to the boards by hand. Although the circuit conductors were printed on the printed circuit board, the electronic components tended to be discrete elements with individual leads that were soldered, usually by hand, to the printed circuit board conductors. Each circuit board was "custom made". Interconnections between the electronic components on the circuit board and external elements were made via conventional flexible wire leads or conductors. Where the electronic components were to be powered from an external battery (usually a replaceable battery), as in a portable radio, for example, a pair of wire leads were soldered to respective points on the circuit board and, at the other end, to a battery terminal connector or to a battery holder which was mounted remotely from the printed circuit board.

This technique for making connections to printed circuit boards was notably inefficient, requiring much hand wiring, soldering and assembly work, in addition to special packaging techniques that were required to mount and support batteries in a convenient package which also housed the printed circuit boards. Adding to the difficulty was the variety of sizes and shapes of the batteries employed.

With the ever-increasing trend toward miniaturization and standardization, hand wiring techniques have become unacceptable. This is because connections to and from printed circuit boards are preferably made via edge connectors on the printed circuit board; no flexible wire leads will be found on most modern printed circuit board assemblies. This, is of course, is desirable in order to achieve the objective of having printed circuit boards replaceable and interchangeable without interfering with permanent circuit connections.

In cases where an external battery is connected to the printed circuit board, at least one or more edge connectors must be dedicated to the battery and, as before, separate provisions must be made for mounting and securing the battery at a position remote from the printed circuit board. This is neither efficient nor desirable, since it requires additional edge connectors and, as before, separate physical support means to accommodate the battery on a remote assembly, chassis, frame, etc. Moreover, it is an additional advantage to have the battery affixed to the circuit board to be powered and replaceable therewith; usually this means that a circuit board can be removed from its normal connecting socket without destroying the dc source of power.

Today, there are many critical applications for batteries where the battery must supply power to printed circuit components. Examples are computer systems, microprocessor controls, single-chip microcomputers and volatile RAM's (random access, read and write memories). In these applications, the batteries provide a back-up source of power in the event of line power failures, the batteries continuing to supply power in the interim between power failure and restoration. Unless a back-up current independent of the line power source is made available to volatile RAM's, the entire memory of a computer can easily be destroyed upon even a momentary loss of power.

The present invention has as one of its objects the provision of a battery source which is compatible with printed circuit boards and the like. Specifically, it is to provide a rechargeable battery for insertion into any of a number of standard printed circuit boards, or into standard sockets or or receptables for semiconductor chips.

A further object of the invention is to provide a rechargeable cell and battery case combination which is reliable, rugged, and fully compatible with DIP (dual in-line pin) socket configurations.

Yet more general objects are to provide a plug-in battery containing one or more electrochemical cells, to provide a battery which is easily and cost-effectively assembled, and to provide a battery which is rechargeable, removable, replaceable and supportable by the electronic chassis, circuit board, etc. which is to be powered thereby.

SUMMARY OF THE INVENTION

In accordance with the invention, a rechargeable battery includes at least one electrochemical cell, preferably a storage (rechargeable) cell which is housed within a battery case. Terminal pins extending from the battery case are connected at the interior of the case to the cell terminals and are adapted for direct reception by the through-holes of a circuit board or by a mating socket which is affixed to the circuit board to be powered.

The battery case is preferably constructed so as to form, at its interior, recesses for receiving standard cylindrical rechargeable cells (e.g., sealed nickel-cadmium cells), and the terminal pins are so arranged that they may be welded, or otherwise soldered directly to the battery terminals.

For a more complete understanding of the invention and its construction and advantages, reference should be made to the following description and to the drawings.

DETAILED DESCRIPTION OF PREFERRED EMBODIMENTS

Figure 1:
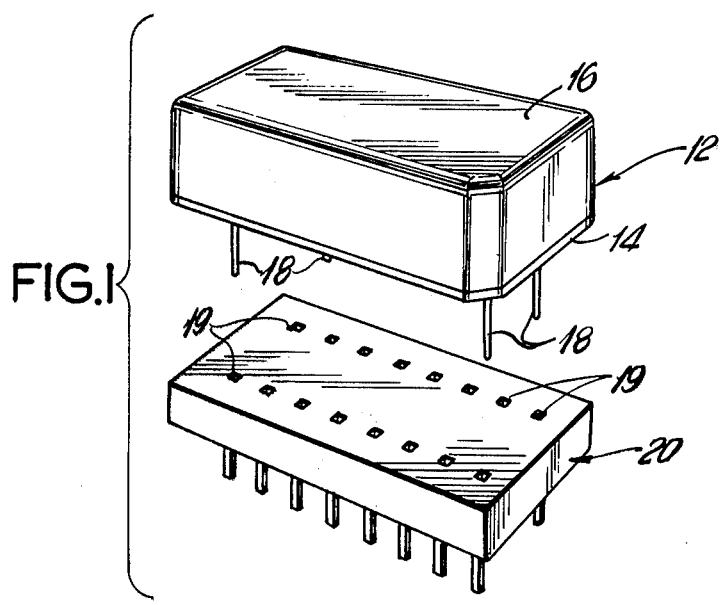
FIG. 1 is an exploded perspective view of a plug-in battery in accordance with the invention, together with its associated socket.

Referring to FIG. 1, the battery unit of the invention comprises a unitary case 12 housing at least one, and preferably two or more, rechargeable electrochemical cells. The casing is desirably of two-part construction, more fully described in connection with FIG. 2, consisting of a base portion 14 and a cover portion 16. Connecting pins 18 adapted for reception by the holes 19 of a socket 20 extend downwardly from underneath the base of the case 12. The socket 20 is a conventional type used to mount multiterminal semiconductor chips (e.g., ROM and RAM memories, integrated circuits, etc.) and has two rows of holes which receive the terminal pins of the mounted component. The socket is known as a dual-in-line pin ("DIP") type socket; it mounts components whose terminal pins are arranged in two (dual) rows of aligned pins.

Four pins are shown in FIG. 1; however, only two pins need be electrically active, i.e., connected to the respective positive and negative terminals of the cell. Pins not electrically active are used to index and locate the plug-in battery on the board or socket and to provide additional mechanical support for holding the battery in place on the circuit board. As will be appreciated from FIG. 1, the battery is connected in circuit simply by plugging the battery case 12 into the socket 20 or, if a socket is not used, into the through-holes of the circuit board (not shown) for mass-production soldering along with the other board components. In place, the battery may be electrically connected for continuous charging when power is supplied to the circuit board externally, and for supplying power to the circuit when external power is lost or removed.

Figure 2:
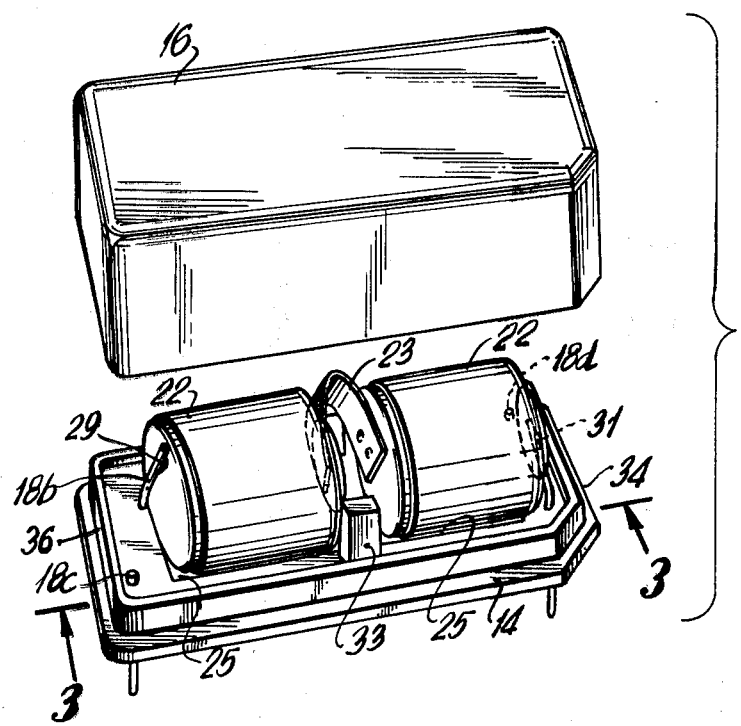
FIG. 2 is an exploded perspective view of a two-cell embodiment of the battery, showing the base portion of the battery case with rechargeable cells in place, and the cover portion.

FIG. 2 illustrates a two-cell rechargeable plug-in battery, with the cover 16 removed to reveal internal components. Each cell 22 is, for example, a General Electric μP80 nickel-cadmium storage cell having a nominal open-circuit voltage of 1.2–1.4 volts. The cells are connected in series, with physically adjacent terminals being electrically interconnected by a flexible conductive strap 23 spot-welded to a respective terminal end of each cell. Cells 22 may, of course, have any selected electrical capacity, matched to the intended application. In one typical application, such as maintaining the memories of the computer bank of a computer system, cells 22 are rated at 65–70 mAH at 25° C.

Figure 3:
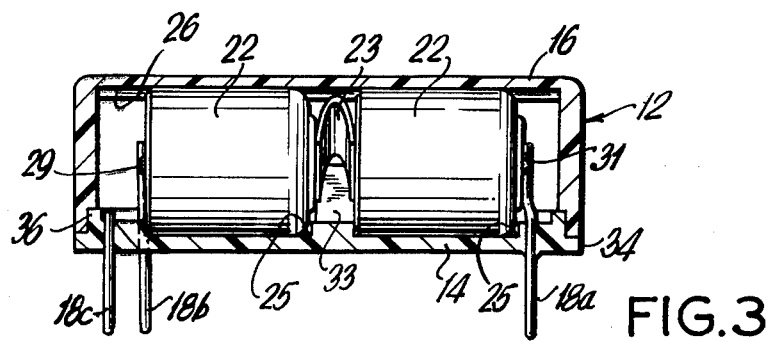
FIG. 3 is a cross-sectional view taken generally along the line of 3—3 in FIG. 2 with the battery cover portion in place.

Referring to FIGS. 2 and 3, each cell is received by a shallow recess 25 in the base 14 of the case. The recesses 25 are shaped to conform to the outline of the cell 22 and thus have a cylindrical concave form. A similar shallow, cylindrical recess 26 is formed in the top of the cover 16 so that when the cover is in place, both the lower and upper portions of the cells 22 project into the respective recesses 25, 26. The recesses serve to position the cells inside the casing and to restrain them from unwanted movement. This relationship is best seen in FIG. 3.

One feature of the invention is the simplicity with which the battery module may be constructed and assembled. Specifically, the terminal pins 18a, 18b extend through and project beneath the base portion 14 of the case and, at the interior, extend upwardly at locations closely adjacent the ends of the cells to contact opposite cell ends. Connections of the pins 18a, 18b to the cells are made by welds to the metallic cell ends. Thus, terminal pin 18b is connected by weld 29, and terminal pin 18a by weld 31. Pins 18c, 18d are locating pins which assist in properly indexing the battery module when it is inserted into the socket and also provide additional mechanical support for the module. Pins 18c, 18d are not electrical circuit with the active pins 18a, 18b, although they could be made active by internal or external connection to one or more cell terminals.

To provide additional mechanical integrity to the battery module and to preclude unwanted movement of the cells 22 inside the casing, projecting members 33 at opposite sides of the base and disposed generally between cells 22 help to maintain cell separation. During accidental jarring of the battery (as when accidentally dropped) these projections preclude excessive end-wise movement of the cells toward each other.

Assembly of the battery module is accomplished rapidly and efficiently. Interconnecting flexible strap 23 is securely welded to cells with the cells standing upright. The cells are then aligned axially, so that the strap 23 folds upon itself, and placed in their respective recesses 25 in the base 14 of the casing. Terminal pins 18a, 18b are then welded to the free terminal ends of the cells at opposite ends of the casing. If necessary, the pins may be bent slightly to contact the cell ends. Next the cover 16 is placed over the base 14 and sonically welded to the base. To that end, the base 14 contains a lower flange 34 extending around the periphery of the base, and a boss 36 which abuts the interior surface of the cover and becomes welded to the cover during the sonic welding step. Flange 34 serves to positionally locate the cover during assembly.

It should be noted that the cover and boss dimensions bring about an interference fit between the two surfaces until the sonic energy causes localized melting, deformation and ultimately fusing of the base and cover. Case components are formed from a suitable rugged plastic, such as polyphenylene sulfide, glass filled. Pins 18 are gold plated nickel.

Figure 4:
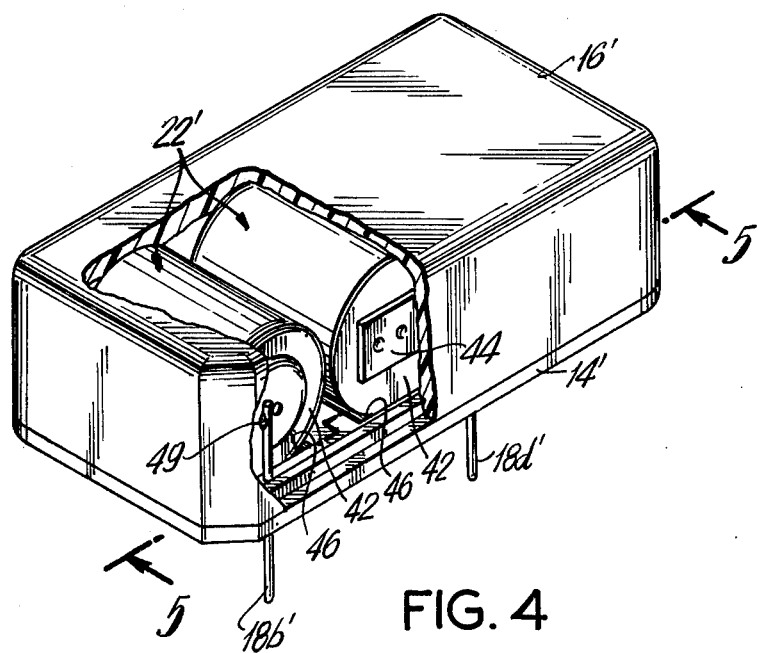
FIG. 4 is a cutaway perspective view of a three-cell embodiment of the invention.
Figure 5:
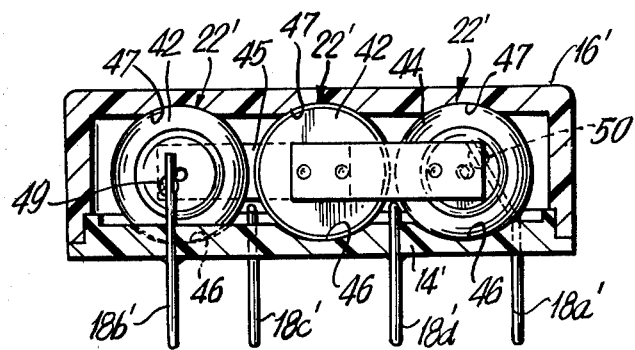
FIG. 5 is a cross-sectional view taken generally along the lines 5—5 of FIG. 4.

FIGS. 4–5 show an alternate embodiment useful for three or more cells. The cells 22' themselves are identical to those shown in FIGS. 2–3; here, however, the axes of the cells are disposed transversely of the major axis of the battery case and are in side-by-side relation. Adjacent cell terminals 42 are of opposite polarity and are electrically interconnected in series by welded conductive straps 44, 45. The battery module thus delivers a nominal 3.6 volts to the terminal pins 18a', 18b'. Pins 18c', 18b' are locating pins, as in the case of FIGS. 2–3, and are not active electrically. In general, the pins 18b', 18d' are aligned along the long direction of the casing, as are pins 18c' and 18a', but at an opposite side of the battery casing.

In the three-cell battery module of FIGS. 4–5, shallow cylindrical recesses 46 in the base 14' assist in positioning the cells 42'. Those recesses, as well as corresponding recesses 47 at the inside of the cover member 16' extend transversely of the case. Here again, active terminal pins 18a', 18b' are welded directly to the free terminal ends 42 of the first and third cells, as shown by welds 49, 50. The portion of the pin 18a', which extends into the interior of the casing is bent so as to bring its end into alignment with the negative terminal of the right hand cell 22'. Pins 18a', 18b', straps 44, 45 and recesses 46, 47 assist in positioning the cells and precluding cell movement during use and handling. Of course, pins 18' need not perform that function, since proper dimensioning of the recesses will provide ample restraining influence.

Construction of three-cell battery module is similar to that of the two-cell embodiment. Conductive straps 44, 45 are first welded to the cell ends 42, the cells placed in the recesses 46, the pins 18' welded to the terminals and, finally, the cover and base sonically welded.

With typical nickel-cadmium rechargeable cells rated at 65-70 mAH, a 2.4 volt (2-cell) plug-in battery module will typically support a small memory drawing 10 microamperes for almost three months, or a larger memory drawing ½ amp for more than five minutes. A three-cell plug-in battery of the type described weighs less than one ounce (less than 30 grams). Both embodiments are capable of operation at temperatures of −20° C. to +50° C. during discharge. Since the cells have low internal resistance in long self-discharge, the plug-in units are adaptable to a wide range of service conditions. Moreover, the battery voltage may be increased simply by mounting two or more associated modules on the circuit board and interconnecting one of the terminal pins from each module.

The embodiments described above are representative preferred constructions, but modifications and variations can be made without departing from the scope of the invention as defined in the claims, and thus the invention is not restricted to the precise constructions shown.

What is claimed is:

1. A battery compatible with printed circuit boards and the like comprising:
    at least one electrochemical sealed, rechargeable storage cell having positive and negative terminals;
    a battery case encasing said storage cell, said case having a base portion supporting said cell so as to expose the terminals thereof, and a cover portion dimensioned to control and position said cell within said case, when joined to the base portion, with the axis of said cell generally parallel to said base portion;
    at least two terminal pins electrically connected to respective cell terminals extending from the battery case through said base portion, said terminal pins being directly affixed to the cell terminals so as to restrain said cell terminals against movement relative to said base portion prior to joining said cover portion to said base portion, said terminal pins projecting from said case through said base for affixing said case and said storage cell therein to a printed circuit board and for electrically connecting said storage cell to the circuit of said board.

2. The battery of claim 1 further comprising:
    at least one further storage cell located inside the battery case and electrically interconnected with the first cell to form a multicell battery.

3. The battery of claim 2 wherein:
    said cells are sealed cylindrical cells and are disposed end-to-end within the casing,
    the casing having means at the interior thereof for restraining said cells against movement therewithin.

4. The battery of claim 3, wherein said restraining means comprises a recess in at least one of the base and cover portions for receiving the cells.

5. The battery of claim 4, further comprising:
    spacing means disposed between adjacent cells integral with the case for restricting movement of adjacent cells toward each other.

6. The battery of claim 3, wherein:
    said cells are interconnected by a flexible conductive strap directly affixed to the cell terminals and having a length exceeding the end-to-end spacing between cells for permitting connection of adjacent terminals of said cells to be made prior to assembly of the battery.

7. The battery of claim 2, wherein:
    said cells are sealed cylindrical cells and are disposed in side-to-side relationship with the casing, the casing having mutually spaced recesses at the interior thereof, each receiving a portion of a respective cell to position it within the casing.

8. The battery of claim 1 wherein:
    said battery includes at least two electrically interconnected cells, and
    the terminal pins are located so as to project into the casing interior adjacent the terminal ends of the respective cells connected thereto.

9. The battery of claim 1, further comprising:
    at least one locater pin extendng from said case and aligned along the direction of the case's axis with one of said terminal pins.

10. In combination with the battery of claim 1:
    a receptable for removably receiving the pins of the battery and means for connecting said receptable to an electrical circuit board.

11. A battery-powered electrical circuit comprising, in combination:
    a printed circuit board carrying an electrical circuit to be powered;
    a battery having (a) at least one rechargeable storage cell having positive and negative terminals, (b) a battery case housing said storage cell and (c) at least two terminal pins extending from the battery case and electrically connected to the cell terminals for connecting said storage cell to the electrical circuit; and
    means connecting said terminal pins to the electrical circuit so as to physically support said cell and said housing on said circuit board and to charge said cell when said circuit is powered by an external electrical source, said cell supplying power to said electrical circuit in the absence of power from the external source.

12. The battery-powered circuit of claim 11, further comprisng:
    a receptacle mounted on said circuit board for removably receiving the terminal pins of said battery and for electrically interconnecting said pins to said electrical circuit.

* * * * *